United States Patent [19]

Allerd et al.

[11] Patent Number: 4,582,764
[45] Date of Patent: Apr. 15, 1986

[54] SELECTIVE ABSORBER AMORPHOUS ALLOYS AND DEVICES

[75] Inventors: David D. Allerd, Troy; Jaime M. Reyes, Birmingham; Jerry A. Piontkowski, Berkley, all of Mich.

[73] Assignee: Energy Conversion Devices, Inc., Troy, Mich.

[21] Appl. No.: 423,425

[22] Filed: Sep. 24, 1982

[51] Int. Cl.$^4$ .............................................. F24J 2/48
[52] U.S. Cl. .................. 428/623; 428/627; 428/630; 126/901; 136/258; 350/1.7
[58] Field of Search .............. 428/621, 622, 623, 627, 428/630, 663, 665; 136/258 AM; 126/901; 350/1.7; 420/429, 903, 556; 423/276, 297, 344

[56] References Cited

U.S. PATENT DOCUMENTS

| | | | |
|---|---|---|---|
| 4,098,956 | 7/1978 | Blickensderfer et al. | 428/627 |
| 4,126,150 | 11/1978 | Bell et al. | 136/258 AM |
| 4,149,025 | 4/1979 | Niculescu | 136/206 |
| 4,166,880 | 9/1979 | Loferski et al. | 428/457 |
| 4,177,474 | 12/1979 | Ovshinsky | 136/258 |
| 4,226,897 | 10/1980 | Coleman | 427/39 |
| 4,264,358 | 4/1981 | Johnson et al. | 420/429 |
| 4,334,523 | 6/1982 | Spanoudis | 126/901 |
| 4,416,916 | 11/1983 | Aykan et al. | 126/901 |
| 4,431,708 | 2/1984 | Carver et al. | 350/1.7 |

OTHER PUBLICATIONS

Niihara et al., "Chemical Vapor-Deposited Silicon Nitride", Journal of Material Science, No. 4, Apr. 1976, pp. 593-603.
Griffith, "Amorphous Semiconductors in Photovoltaic and Solar Thermal Conversion", Sun Proceedings Int'l, Solar Energy Society Congress, 1978, pp. 638-642.
Griffith, "Fundamental Aspects of Amorphous Semiconductors in Solar Thermal Conversion", Chemical Abstracts, vol. 89:200362u, 1978, p. 163.
M. Okuyama, et al., Selective Absorber Using Glow--Discharge Amorphous Silicon for Solar Photothermal Conversion, Apr. 17, 1980, pp. 405-413.
B. O. Scraphin et al., Solar Energy Thermal Converters Fabricated by Chemical Vapor Deposition, Oct. 7-11, 1973, pp. 1-9.

Primary Examiner—L. Dewayne Rutledge
Assistant Examiner—Robert L. McDowell
Attorney, Agent, or Firm—Richard O. Gray, Jr.

[57] ABSTRACT

There is disclosed a new and improved material and device for improved selective absorption of light energy for use in photothermal applications and a method and apparatus for manufacturing same.

The device includes a layer of thermal infrared radiation reflecting material containing a transition metal or stainless steel. A solar radiation absorbing layer is deposited over the infrared reflecting layer. This layer comprises either amorphous boron or an amorphous alloy of boron and silicon, boron and germanium or boron and molybdenum.

Finally, a solar radiation antireflecting material layer is deposited over the solar radiation absorbing layer. This layer comprises an amorphous alloy of nitrogen and either silicon or boron.

19 Claims, 17 Drawing Figures

SELECTIVE ABSORBER AMORPHOUS ALLOYS AND DEVICES

BACKGROUND OF THE INVENTION

This invention relates to new and improved materials and devices for improved selective absorption of light energy for use in photothermal applications. Such devices are generally in the nature of a layered composite of materials which, as a whole, absorb sunlight and convert it to heat. A selective absorber for photothermal applications should exhibit high absorption (i.e., low reflectivity) in the terrestrial solar spectrum (TSS), wavelengths of from about 350 nm to about 2300 nm. This is desirable because the terrestrial solar spectrum comprises about 98% of the solar power which typically reaches the surface of the earth and is therefore generally most usable for generating heat. The device should also exhibit low emissivity (i.e. high reflectivity) in the thermal infra-red (TIR) portion of the spectrum, generally much above 2300 nm (for example centered around 7000 nm for an operation of 130° C.), because these are the wavelengths at which bodies tend to radiate heat.

A number of prior art compositions and devices are currently in use as absorbers of solar energy. Among them are the materials like black paint. These materials are solar-nonselective. While exhibiting acceptable absorption in the TSS, these materials exhibit low reflectivity in the TIR. Hence, these materials are inefficient selective absorbers because the low reflectivity in the TIR results in high emissivity in the TIR. Such a characteristic, as noted above, results in emission of power as heat and thus makes these substances far less desirable for photothermal applications.

Another type of prior art material used in solar absorbers is aluminum with a nickel anodized coating. The aluminum provides reflectance in the infra-red regions which is desirable. The nickel anodizing coats the aluminum resulting in a black colored oxide over the aluminum which provides absorption and the rough texture provides some antireflection. The biggest problem with this approach is that an aluminum substrate must be used. Hence, other forms of substrates cannot be used without first applying a layer of aluminum thereto. This, of course, adds extra steps and therefore extra time and expense to the manufacturing process.

A third type of prior art material is referred to as black chrome. This type of material is generally composed of nickel electrolyzed in a chrome bath. The surface is coated with chromium and chromium oxide particles which provide both antireflection and absorption. This approach suffers from the same deficiency as the nickel anodized aluminum selective absorbers in that they cannot be applied to a non-conductive substrate without the interposition of a conductive layer.

Another prior art material in use as a selective absorber of light energy is black cobalt, $Co_3O_4$. This is produced by electrolyzing a substrate in a cobalt bath. Here again, a conductive layer is required if a non-conductive substrate is to be employed.

Two other prior art materials are seemingly well suited to use as selective absorbers but they share a significant limitation. The materials are copper oxide deposited on copper and nickel oxide deposited on nickel conversion coatings. The copper oxide exhibits satisfactory absorption and low emissivity. The nickel coating has a texture which provides antireflection and the nickel oxide provides absorption.

The limitation shared by these two, which is also found in any of the above mentioned selective absorbers, becomes apparent when attempting to employ a selective absorber as discussed above in one of the most significant applications for photothermal devices. That application includes use of a solar concentrator. The solar concentrator functions to focus sunlight onto the selective absorber to concentrate solar radiation. The problem is that when the surfaces sit in air, the elevated temperatures encountered induce oxidation of the materials rendering them substantially useless for their intended purpose.

In evacuated tube-type systems, oxidation is not a problem. However, a further source of inefficiency becomes apparent when a selective absorber made in solution is used in conjunction with these types of collectors. These collectors are generally constructed of two glass tubes, one having a smaller diameter than and being longitudinally arranged within the other. The space between the tubes is evacuated to prevent heat transfer to the outside. The selective absorber material covers the outer surface of the inner tube. In such a configuration, light will penetrate the outer tube and be absorbed by the selective absorber while, theoretically, emission of the heat absorbed is blocked by the evacuated space. The problem arises from the fact that materials made in solution contain water. Materials made in solution out gas water and other gasses into the space between the tubes. The outgassing causes the loss of the vacuum which in turn allows loss through heat transfer.

The device of the present invention utilizes a selective absorber layer of an amorphous material which provides a number of advantages over the prior art materials.

First, the absorption edge of an amorphous material can be changed at will. In other words, the material can be adjusted for maximum absorption over the TSS and minimum emissivity of the TIR wavelengths.

Another advantage over the prior art is that amorphous materials of the present invention can be produced which exhibit greater absorption of radiant energy than crystalline materials having the same composition.

Another advantage is that the index of refraction of an amorphous material can be graded more uniformly from one extreme to the other than can crystalline materials. This is desirable because a gradual increase, as a function of film depth, in the index of refraction causes light to be more readily absorbed. Abrupt changes in the index of refraction contribute to greatly increased reflectivity and therefore decreased absorption.

Amorphous materials can be produced with controlled and predetermined indices of refraction not possible with crystalline and polycrystalline materials of the same composition. This allows matching of the indices of refraction of two adjoining materials to decrease the reflection off the interface of the materials and therefore increase absorption.

Another advantage of the use of amorphous materials in selective absorbers is that amorphous films lack polycrystalline grain boundaries. This is desirable because such grain boundaries act as oxygen or moisture pathways. Oxygen and moisture are two of the predominate causes of film degradation.

It should be noted that a number of alloys can be formed with amorphous materials which do not even exist in crystalline or polycrystalline form. The inherent advantage in the increased number of alloys available for general or specialized applications is obvious.

Finally, amorphous materials are easier and less expensive to deposit and can be deposited at temperatures lower than those required for depositing crystalline or polycrystalline materials. Lower deposition temperatures lead to substantially decreased damage to surfaces on which the material is deposited which in turn allows a substantially greater number of possible substrates to be utilized with the device.

SUMMARY OF THE INVENTION

The present invention provides new and improved materials and devices for improved selective absorption of light energy for use in photothermal applications and a method of manufacturing same. The new photothermal device includes a layer of solar radiation absorbing material which exhibits high absorption in the terrestrial solar spectrum (TSS) (i.e. wavelengths of from about 350 nm to about 2300 nm). There is also included a layer of thermal infrared radiation reflecting material which exhibits low emissivity in the thermal infrared (TIR) portion of the spectrum (i.e. wavelengths above 2300 nm).

Finally, a solar antireflecting layer is included to minimize reflectivity in the TSS.

The thermal infrared radiation reflecting material preferably comprises a transition metal or stainless steel. Aluminum or coinage metals, namely copper, silver or gold, can also be used, especially in conjunction with thick absorber layers.

The selective absorber layer comprises amorphous boron or an amorphous boron alloy including silicon, germanium, or molybdenum deposited over the infrared reflecting layer. The utilization of amorphous materials as a selective absorber of radiant energy provides a number of significant advantages over the prior art materials including greatly increased absorption of radiant energy over crystalline materials having the same composition and an absorption edge which can be adjusted at will to maximize absorption over the TSS and minimize emissivity over the TIR.

The solar antireflecting layer preferably comprises an amorphous alloy of either nitrogen or oxygen and either silicon or boron which is deposited over the solar absorbing layer and serves to decrease surface reflectance and therefore aid absorption of light energy.

DESCRIPTION OF THE PREFERRED EMBODIMENT

Figure 1:
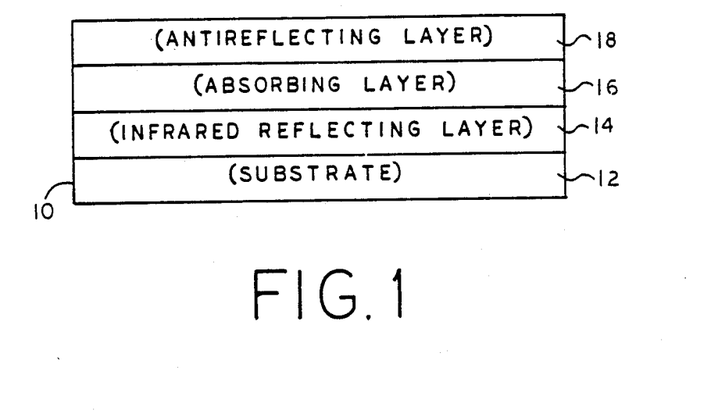
FIG. 1 is a partial, cross-sectional side view of one embodiment of a device for improved selective absorption of light energy made in accordance with the present invention.

Referring now more particularly to FIG. 1, there is shown a partial, cross-sectional side view of an improved device 10 for the selective absorption of light energy according to the present invention. The device includes a substrate 12, a thermal infrared radiation reflecting layer 14, a solar absorption layer 16 and a solar radiation antireflecting layer 18.

In one preferred embodiment, the thermal infrared radiation reflecting layer 14 comprises a transition metal or stainless steel or an alloy or compound of a transition metal or stainless steel. These materials are employed because they exhibit low emissivity (i.e. high reflectivity) in the thermal infrared (TIR) portion of the spectrum, generally above 2300 nm and medium to high solar radiation absorption. The low emissivity in the TIR is highly desirable because these are the wavelengths at which bodies tend to radiate heat.

Transition metal compounds which work particularly well as thermal infrared radiation reflecting materials are borides, carbides and nitrides of zirconium, hafnium, titanium, molybdenum and tungsten.

The thermal infrared radiation reflecting layer 14 can also serve as the device substrate or the infrared reflecting layer 14 can be deposited on the separate substrate 12 of, for example, glass or stainless steel.

In another embodiment of the present invention, when the thermal infrared reflecting layer 14 also serves as the device substrate 12, aluminum or the coinage metals, namely copper, silver or gold, can be used to form the substrate and the infrared reflecting layer 14. These materials are particularly efficacious when employed in conjunction with thick selective absorber layers 16. By thick absorber layers, applicants refer to those absorber layers 16 of the order of 1 micron or greater in thickness.

It should be noted that in addition to the alloys and compounds discussed above for use in the TIR layer, alloys of the aforementioned compounds also may be utilized with satisfactory results.

A preferred embodiment of the solar absorbing layer 16 comprises preferably amorphous boron or amorphous alloys of boron and silicon, germanium or molybdenum. The boron-silicon alloy preferably contains from about 5 percent to about 85 percent silicon. The boron-germanium alloy preferably contains up to about 95 percent germanium. The boron-molybdenum alloy contains up to 20 percent molybdenum.

All of these amorphous boron materials exhibit excellent absorption in the TSS as illustrated hereinafter with respect to FIGS. 3–5. Moreover, the amorphous structure of the material provides a number of significant advantages over the prior art materials.

First, the absorption edge of an amorphous material can be changed at will. In other words, the material can be adjusted for maximum absorption over the TSS and minimum emissivity of the TIR wavelengths as illustrated hereinafter with respect to FIGS. 9–17. Furthermore, amorphous materials of the present invention can be produced which exhibit greater absorption of radiant energy than crystalline materials having the same composition.

The solar radiation antireflecting material layer 18 preferably comprises an amorphous alloy of either boron and nitrogen, silicon, and nitrogen, silicon and oxygen or silicon, oxygen and nitrogen. The advantages realized by the use of these materials are again due in substantial part to their amorphous character. For example, the index of refraction of an amorphous material can be graded more uniformly from one extreme to the other than can crystalline materials. This is desirable because a gradual increase, as a function of film depth, in the index of refraction causes light to be more readily absorbed. Abrupt changes in the index of refraction contribute to greatly enhanced reflectivity and therefore decreased absorption.

Amorphous materials such as these can also be produced with controlled and predetermined indices of refraction as illustrated hereinafter with respect to FIGS. 6–8. Such control and predetermination are not possible with crystalline and polycrystalline materials of the same composition. This allows matching of the indices of refraction of two adjoining materials to decrease the reflection off the interface of the materials and therefore increase absorption.

Furthermore, it should be noted that amorphous materials lack polycrystalline grain boundaries. This is particularly desirable because such grain boundaries act as conduction pathways for oxygen and moisture. Oxygen and moisture are two of the predominate causes of material degradation.

Obviously, all of the above mentioned attributes of amorphous materials are highly desirable for photothermal applications. In one preferred embodiment, the index of refraction of the solar radiation antireflecting material will be tailored to equal approximately 85 to 100% of the square root of the index refraction of the solar absorption material. This, as noted above, will substantially eliminate any reflection of incoming light off the interface of the materials and therefore increase absorption.

Figure 2:
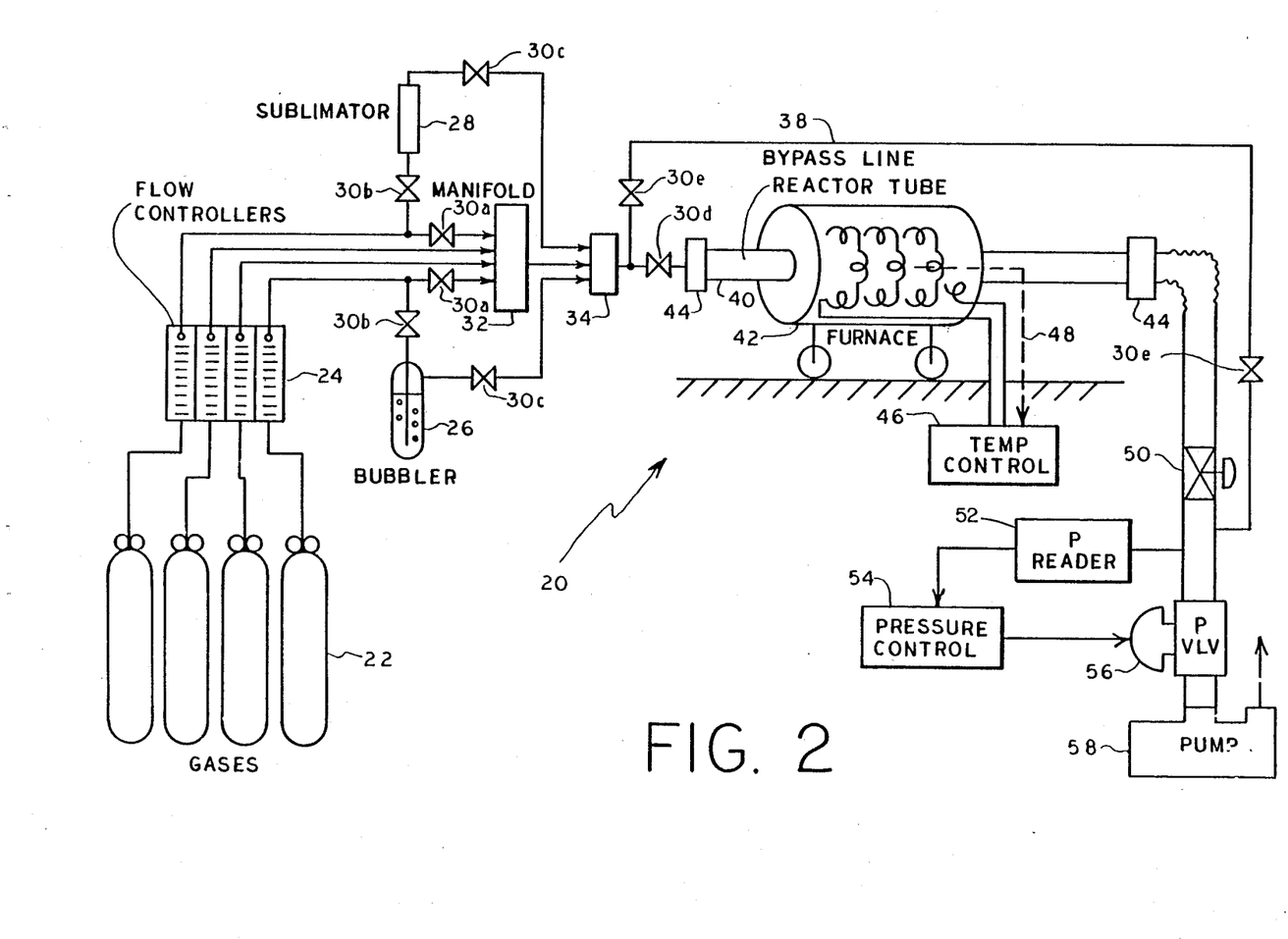
FIG. 2 is a schematic representation of one embodiment of a system for making the device of the present invention.

Referring now more particularly to FIG. 2, there is shown a schematic representation of one preferred embodiment of a system for manufacturing the devices of the present invention. The system comprises cylinders 22 for holding reaction gases, a flow controller 24, a bubbler 26, a sublimator 28, assorted shutoff valves 30a through 30e, a primary manifold 32 and a secondary manifold 34. The system 20 further comprises a bypass line 38, a reactor tube 40, a cylindrical furnace 42, couplers 44, a temperature control 46, a feedback mechanism 48, a coarse pressure adjustment valve 50, a pressure reader 52, a pressure control 54, a fine pressure adjustment valve 56 and a pump 58.

The reaction gases are held in cylinders 22 and routed through flow controllers 24 and shutoff valves 30a to the primary manifold 32 where the majority of the reaction mixtures are combined. The bubbler 26 functions to vaporize liquid hydrazine ($N_2H_4$) which is used to deposit nitrides of transition metals when they are incorporated into the infrared radiation reflecting layer 14. Hydrazine is also used to deposit the nitrogenous alloys of silicon, silicon and oxygen or boron to be used in the antireflecting layer 18.

The sublimator 28 is used to convert solid molybdenum hexacarbonyl ($Mo(CO)_6$) to a gas. This material is used in the deposition of the amorphous alloy of boron and molybdenum when incorporated into the solar absorption layer 16.

The secondary manifold 34 serves to mix the gaseous hydrazine or molybdenum hexacarbonyl when the bubbler 26 or sublimator 28 are used, with the reaction mixture formed in the primary manifold 32. When the bubbler 26 or sublimator 28 are used, valves 30a are closed and valves 30b and 30c are opened. When gases other than hydrazine and molybdenum hexacarbonyl are used, valves 30b and 30c are closed and valves 30a opened.

After the secondary manifold 34, a shutoff valve 30d is inserted in the system 20. The bypass line 38 and its shutoff valve 30e are interposed between the secondary manifold 34 and shutoff valve 30d. Initially valve 30d will be closed and valves 30e will be opened so that the bypass line 38 can be used to bypass the reactor tube 40 and check the mixture before actual deposition. This is accomplished by reading the partial pressure of the reactants at the pressure reader 52.

After the proportions of the gas mixture have been verified shutoff valves 30e are closed and shutoff valve 30d in front of coupler 44 is opened to allow the reaction mixture to enter the reactor tube 40. In one preferred embodiment, the reactor tube is a Pyrex or quartz chemical vapor deposition hot wall reactor 40 surrounded by a cylindrical furnace 42 used to heat the substrate 12 to a given reaction temperature (discussed infra). The furnace 42 is connected to a temperature control 46 with a suitable feedback mechanism 48 from inside the reactor tube 40.

The ambient pressure within the reactor tube 40 during deposition is monitored by the pressure reader 52 which in turn is connected to a pressure control 54. The pressure control 54 is used in conjunction with the pump 58, coarse pressure adjustment valve 50 and the fine pressure adjustment valve 56 to control the ambient pressure within the reactor tube 40 when deposition is taking place.

Utilizing the above described system 20 the thermal infrared radiation reflecting layer 14 is first deposited by chemical vapor deposition on the substrate 12, if a distinct substrate 12 is employed. As noted above, in accordance with one preferred embodiment of the invention an infrared reflecting layer 14 comprises a transition metal or stainless steel. The transition metals which have been found particularly useful in the present context are tungsten, molybdenum, zinc, platinum and nickel. Deposition of any of these can be accomplished by pyrolyzing a carbonyl or halide of the particular metal or reacting the halide of the particular metal with hydrogen.

In accordance with another preferred embodiment, also noted above, compounds of transition metals can be employed in the TIR layer 14. Specifically the borides, carbides and nitrides of zirconium, hafnium, titanium, molybdenum and tungsten can be used. These compounds may be deposited using the system 20 by reacting the metal halide with $BCl_3$ or $B_2H_6$ in the case of the boride, a hydrocarbon such as methane ($CH_4$) or acetylene ($C_2H_2$) in the case of the carbide, or a hydride of nitrogen such as $NH_3$ or $N_2H_4$ in the case of the nitride. All of these reactions, whether to deposit the metal or the compound, would be carried out, according to the preferred embodiment, at elevated substrate temperatures, preferably in the range of about 800° C. to about 1200° C.

In accordance with one particular embodiment of the invention, tungsten is used in the TIR layer and is deposited over a glass substrate. As tungsten is often reacted for deposition purposes in the form of its fluoride compound (i.e. $WF_6$) and fluoride reaction products will etch glass, an intervening layer of an amorphous silicon alloy is first deposited over the glass. This layer need only be approximately 3000 Å thick. The silicon alloy is deposited by chemical vapor deposition utilizing silane in a hot wall reactor at a substrate temperature of about 600° C. and a pressure in the range of 2 to 30 Torr.

The solar absorber material layer 16 is next deposited over the thermal infrared radiation reflecting layer 14. In one embodiment, the solar absorber layer 16 is deposited to a thickness of between approximately one-eighth ($\frac{1}{8}$) and three-eighths ($\frac{3}{8}$) of the wavelength of the maximum energy point of the radiation spectrum within the material forming the radiation absorbing layer 16. Preferably, the absorber layer 16 is deposited to a thickness of approximately one-fourth ($\frac{1}{4}$) the wavelength of the maximum energy point of the radiation spectrum within the material forming the radiation absorbing layer 16. According to one preferred embodiment, amorphous boron is employed as the solar absorber and it is deposited using the hydride, $B_2H_6$, at substrate temperatures in the range of about 250° C. to about 477° C. and pressure generally below 50 Torr.

Another embodiment calls for the use of an amorphous alloy of boron and germanium which is deposited with a similar use of the corresponding hydrides, $B_2H_6$ and $GeH_4$, at substrate temperatures in the range of about 377° C. to about 477° C. and pressure generally below 10 Torr.

In accordance with still another embodiment, an amorphous alloy of boron and molybdenum can be used as the solar absorber 16. To deposit this alloy, the hydride of boron, $B_2H_6$, is reacted with molybdenum hexacarbonyl, $Mo(CO)_6$, at substrate temperatures in the range of about 250° C. to about 300° C. and pressure generally below 20 Torr.

Finally, the solar radiation antireflecting material layer 18 is deposited over the solar absorber 16. As noted previously, a preferred embodiment calls for the antireflecting layer 18 to comprise an amorphous alloy of either boron and nitrogen, silicon and nitrogen, silicon and oxygen or silicon, oxygen and nitrogen.

The boron-nitrogen alloy is preferably deposited by reacting the hydride of boron, $B_2H_6$, with $N_2H_4$ at substrate temperatures generally in excess of 350° C. and pressure at or below atmospheric pressure.

The silicon-nitrogen alloy is preferably deposited by reacting silane, $SiH_4$, with a hydride of nitrogen (e.g. $N_2H_4$) at substrate temperatures generaly in excess of 500° C. and preferably in the approximate range of about 650° C. to about 700° C. To deposit the silicon-oxygen or silicon-oxygen-nitrogen alloys as the antireflecting layer 18, one can preferably add oxygen or water vapor to the appropriate deposition atmosphere.

Figure 3:
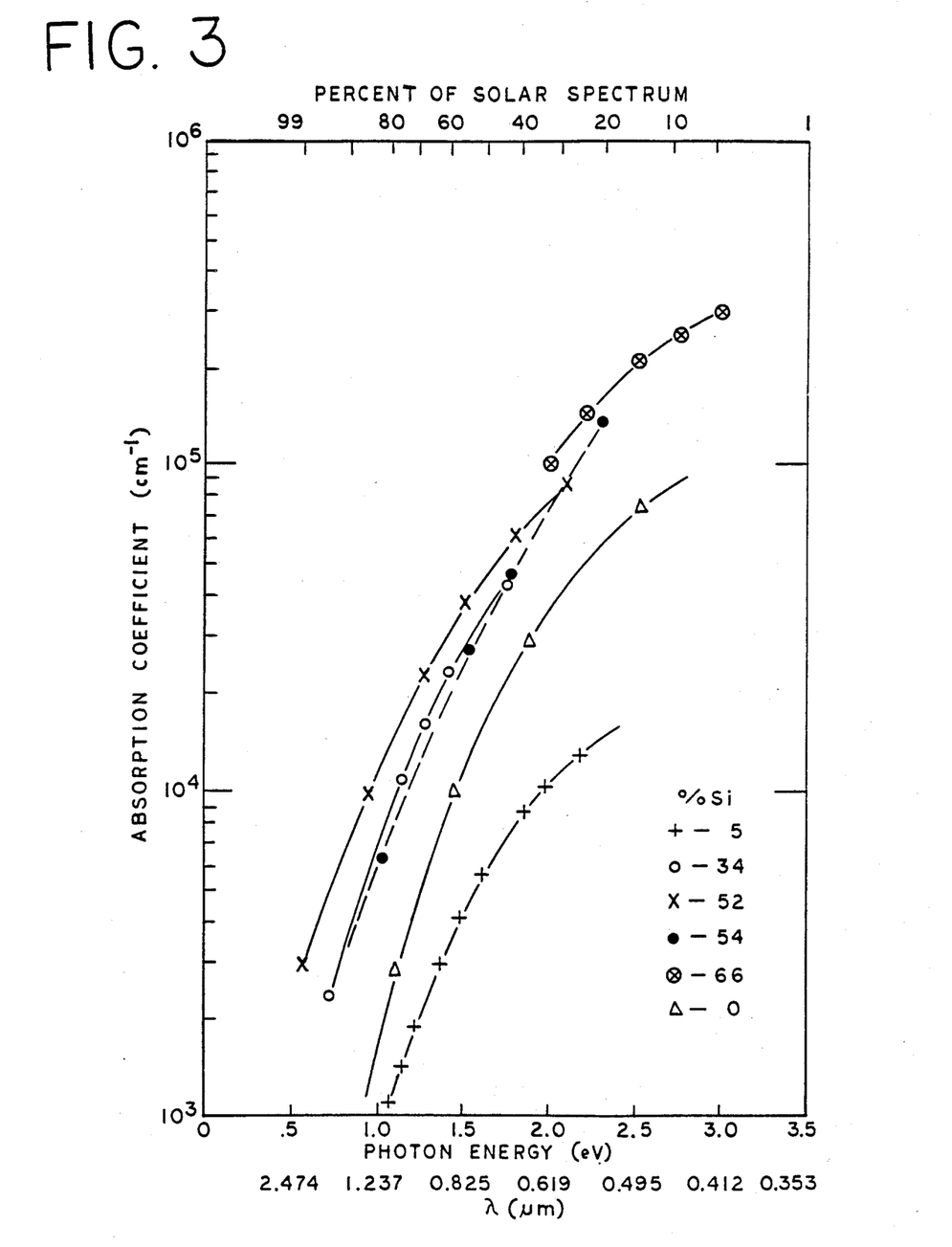
FIG. 3 is a graph of the absorption characteristics of a solar absorbing layer comprising an amorphous alloy of boron and silicon in accordance with one embodiment of the present invention.
Figure 4:
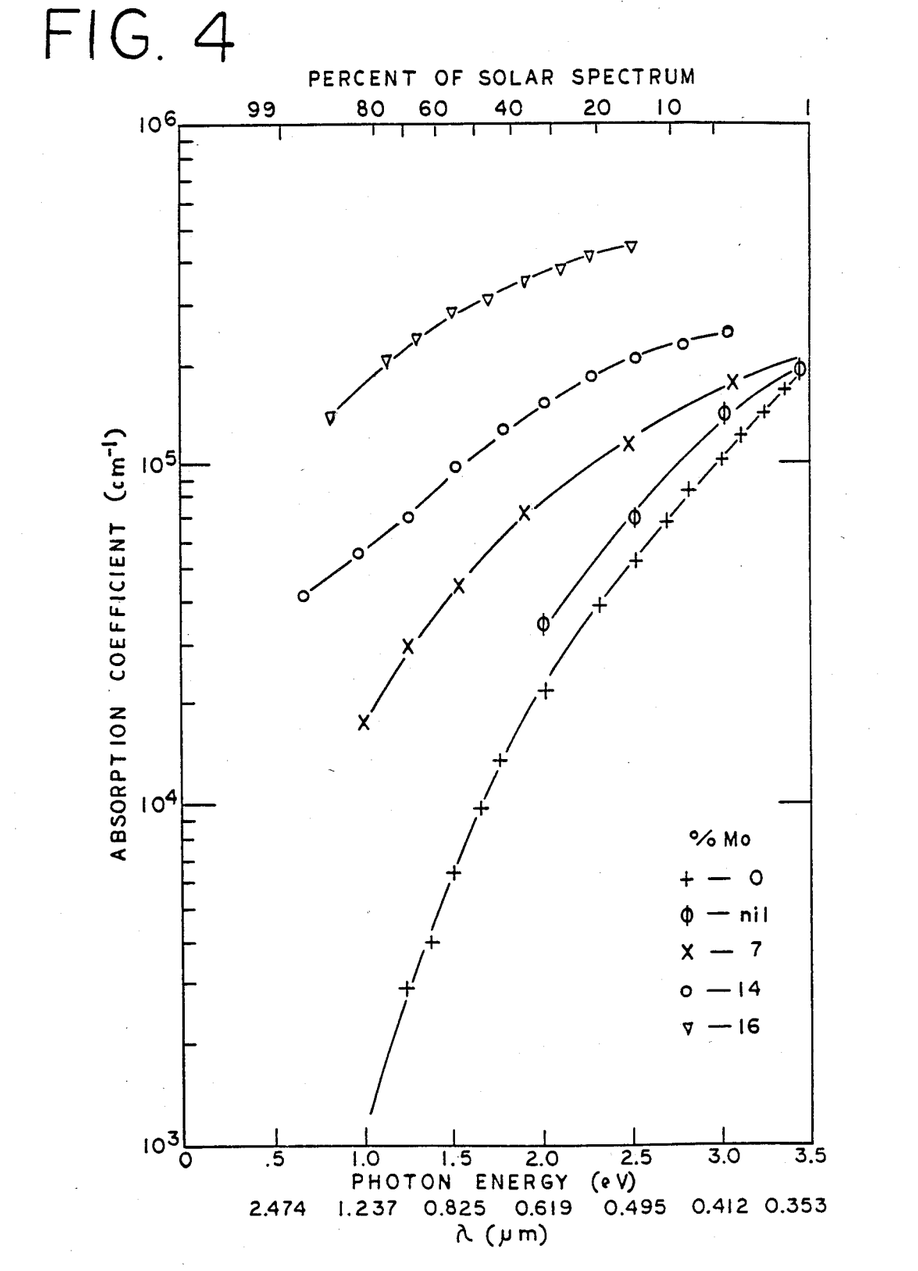
FIG. 4 is a graph of the absorption characteristics of a solar absorbing layer comprising an amorphous alloy of boron and molybdenum in accordance with another embodiment of the present invention.
Figure 5:
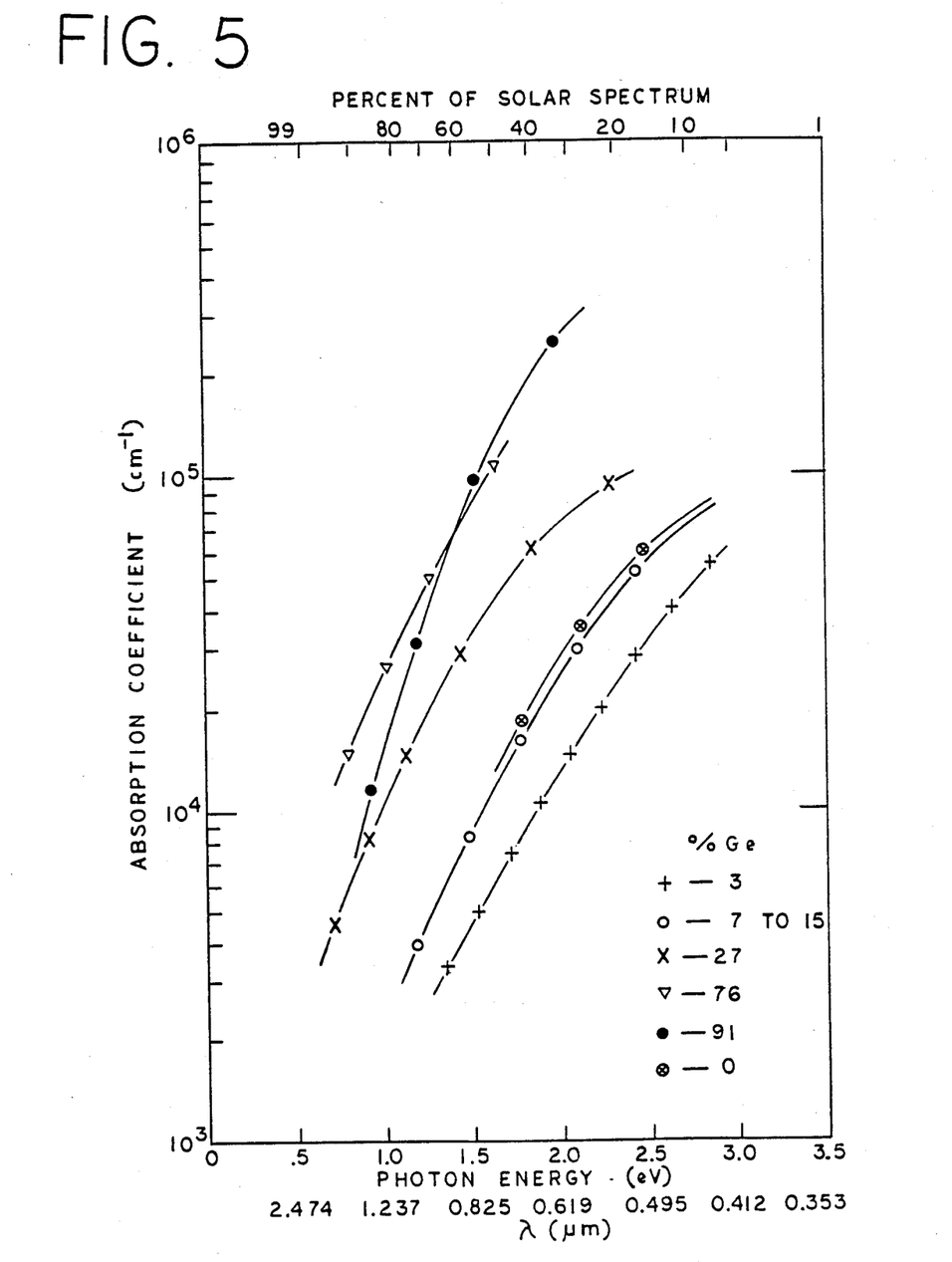
FIG. 5 is a graph of the absorption characteristics of a solar absorbing layer comprising an amorphous alloy of boron and germanium in accordance with a further embodiment of the present invention.

Referring now more particularly to FIGS. 3 to 5, there are shown the absorption characteristics for three of the specific materials discussed above as preferred embodiments of the solar absorber layer 16.

FIG. 3 represents the coefficient of absorption of the amorphous boron-silicon alloy for five given percent compositions of silicon and boron at a given wavelength and corresponding photon energy of light being absorbed. It should be noted that the photon energy and the wavelength are inversely proportional by a factor of 1.237. In other words:

$$\lambda = \frac{1.237}{PE}$$

where λ is the wavelength in microns and PE is the photon energy in eV.

FIG. 4 represents a similar graph of the absorption characteristics for a solar absorber layer 16 comprising an amorphous alloy of boron and molybdenum. Note that the designation "nil" for the amount of molybdenum in the boron-molybdenum alloy sample which resulted in that particular curve in FIG. 4 represents a composition containing trace elements of molybdenum. FIG. 5 illustrates the same information for an absorber layer 16 comprising an amorphous alloy of boron and germanium.

As can be seen from the graphs each material has a characteristic absorption coefficient for a given photon energy or wavelength of light depending on the percent composition of the material.

These three graphs are particularly pertinent because one can calculate the percent of the incident light which is transmitted through the absorber layer 16, and thus the amount of incident light absorbed by the absorber layer 16. This can be accomplished by using the applicable absorption coefficient and Beer's Law which is given by the equation:

$$\frac{I}{I_o} = e^{-\alpha d}$$

where I is the intensity of light transmitted, $I_o$ is the intensity of the incident light, α is the absorption coefficient for a given wavelength of light and percent composition of absorber material and d is the thickness of the solar absorber layer 16 in centimeters.

In the present invention, the incident light, after being transmitted through the selective absorber layer 16, is reflected off the thermal infrared reflecting layer 14 and back through the absorber layer 16. Therefore, assuming 100% reflectivity in the thermal infrared reflecting layer 14, the absorber layer 16 has an effective thickness twice that of its actual thickness. That is to say that Beer's Law, with respect to the present invention, can be written as:

$$\frac{I}{I_o} = e^{-\alpha 2d}$$

For example, assuming α equals $10^5$, d equals 1000 Å ($10^{-5}$ cm), then;

$$\frac{I}{I_o} = e^{-10^5(2\times 10^{-5})}$$

or 13.5% of the incident light is transmitted while the other 86.5% is absorbed in the solar absorber material 16.

Also, as can be seen in FIGS. 3 to 5, all of the solar absorber materials absorb energy of shorter wavelength and higher photon energy more readily than light of longer wavelength and lower photon energy.

Figure 6:
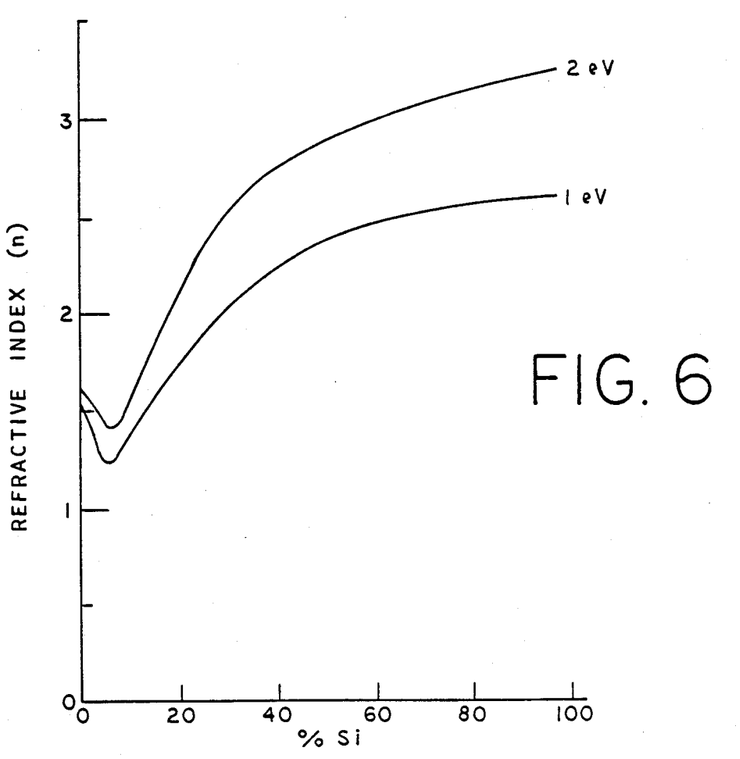
FIG. 6 is a graph of the refractive index versus percent composition of a solar absorbing layer comprising an amorphous alloy of boron and silicon in accordance with an embodiment of the present invention.
Figure 7:
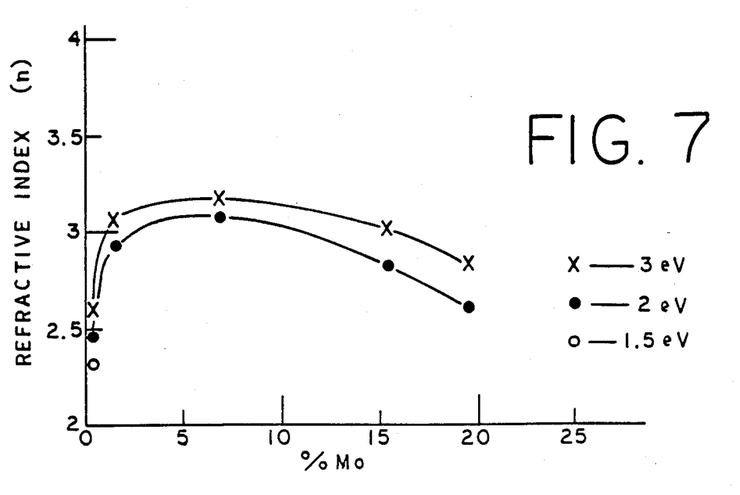
FIG. 7 is a graph of the refractive index versus percent composition of a solar absorbing layer comprising an amorphous alloy of boron and molybdenum in accordance with an embodiment of the present invention.
Figure 8:
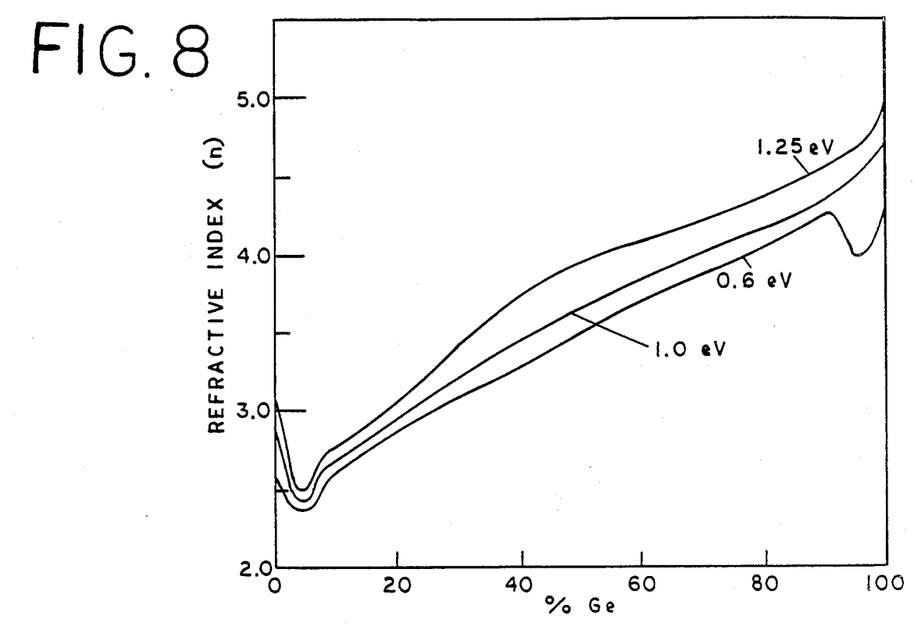
FIG. 8 is a graph of the refractive index versus percent composition of a solar absorbing layer comprising an amorphous alloy of boron and germanium in accordance with an embodiment of the present invention.

Referring now more particularly to FIGS. 6, 7 and 8 there is shown in each a graph of index of refraction versus percent composition of solar absorber material for three representative photon energies or light wavelengths.

FIG. 6 represents the aforementioned parameters for an embodiment of the solar absorber layer 16 comprising an amorphous alloy of boron and silicon. FIG. 7 refers to the amorphous boron-molybdenum alloy and FIG. 8 is the same plot for the amorphous boron-germanium alloy.

These three graphs clearly demonstrate the ease in which the index of refraction of an amorphous material can be predetermined and controlled by merely adjusting the percent composition. These graphs also exemplify the smooth grading of indices of refraction possible with amorphous materials. As noted previously, this uniform increase in index of refraction as a function of film depth contributes substantially to the ready absorption of light. No such smooth grading is possible with crystalline materials and, as also noted previously, abrupt changes in index of refraction contribute to markedly enhanced reflectivity and therefore decreased absorption.

FIGS. 9 through 17 are graphs of percent reflectance versus wavelength for various representative device configurations. It should be remembered that reflectance is inversely proportional to absorption and therefore these graphs illustrate the efficiency of absorption in the TSS as well as reflectivity (or emissivity) in the TIR for the particular device configuration tested.

While FIGS. 9-17 graph percent reflectance for wavelengths up to 2500 nm, it should be noted that the infrared portion of the spectrum extends as high as wavelengths of approximately 100,000 nm. Also, for a given operating temperature, a body will tend to emit energy (e.g. photons) centered around a particular wavelength. In other words, emittance, a parameter to be minimized, will be fixed by the temperature at which the device is operated. Depending on the specific application in which the device of the present invention is to be used, the operating temperature could be between approximately 100° C. and approximately 500° C. The wavelength around which a body will emit the maximum energy for a given operating temperature is given by the equation:

$$\lambda_{max} T_{body} = 2890° \text{ K. } \mu m$$

where $\lambda_{max}$ is the wavelength around which the maximum photons will be emitted and $T_{body}$ is the operating temperature in degrees Kelvin.

For example, at an operating temperature of about 130° C., a body will emit its maximum energy at wavelengths centered around 7000 nm. However, in accordance with the present invention, materials are employed in the thermal infrared reflecting layer that have as one of their properties extremely high reflectivity in the infrared portion of the spectrum. For example, many applications of the present invention will include an operating temperature around 130° C. As noted above, such an operating temperature will induce emission of the maximum amount of photons at wavelengths centered around 7000 nm. At these wavelengths molybdenum exhibits 98.3% reflectivity, tungsten 97%, stainless steel 90% and nickel 92%. In fact, in the embodiments of the present invention wherein thin film (i.e. less than 1 micron) layers are employed, the thermal infrared reflectivity of the device will be within 1% less than the reflectivity of the bare infrared reflector material at any wavelength of interest.

FIGS. 9-17 graph only up to wavelengths of 2500 nm because this is all that is required to establish the absorption characteristics of the device of the present invention in the visible spectrum. Above 2500 nm, the reflectivity is easily calculated as discussed above.

Figure 9:
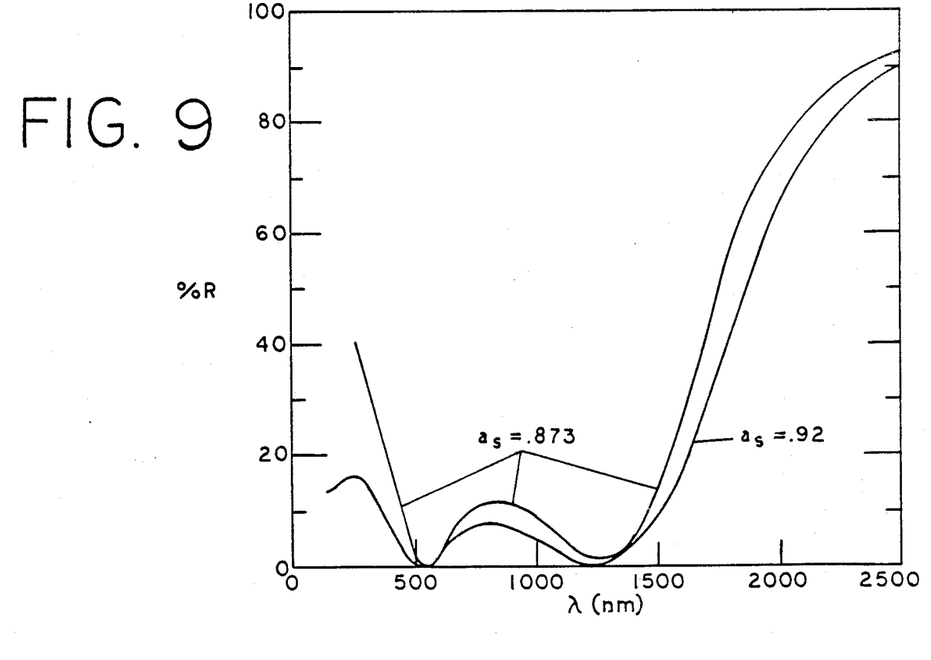
FIG. 9 is a graph illustrating the relationship between the theoretical and empirical curves of percent reflectance versus wavelength for a solar absorbing layer comprising an amorphous alloy of 50% germanium and 50% boron, an infrared reflecting layer comprising tungsten and an antireflecting layer comprising an amorphous alloy of silicon and oxygen in accordance with an embodiment of the present invention.

FIG. 9 compares theoretical and empirical results. The upper solid line represents the theoretical percent reflectance over a spectrum from approximately 300 to approximately 2500 nm of a device having a tungsten TIR layer 14, a solar absorber layer 16 comprising an amorphous alloy of 60% boron and 40% germanium, and an antireflecting layer 18 comprising an amorphous alloy of silicon and oxygen.

The lower line represents actual experimental results for a device having a tungsten TIR layer 14, an amorphous boron-germanium solar absorber layer 16 containing 50% germanium and an antireflecting layer comprising an amorphous silicon-oxygen alloy.

Notice that the experimental results for absorption over the TSS (from about 300 nm to about 2300 nm) are even better than the theoretical. As can be seen, absorption of better than 90% of the incident light within the TSS has been achieved with reflectance approaching 90% at 2500 nm.

Figure 10:
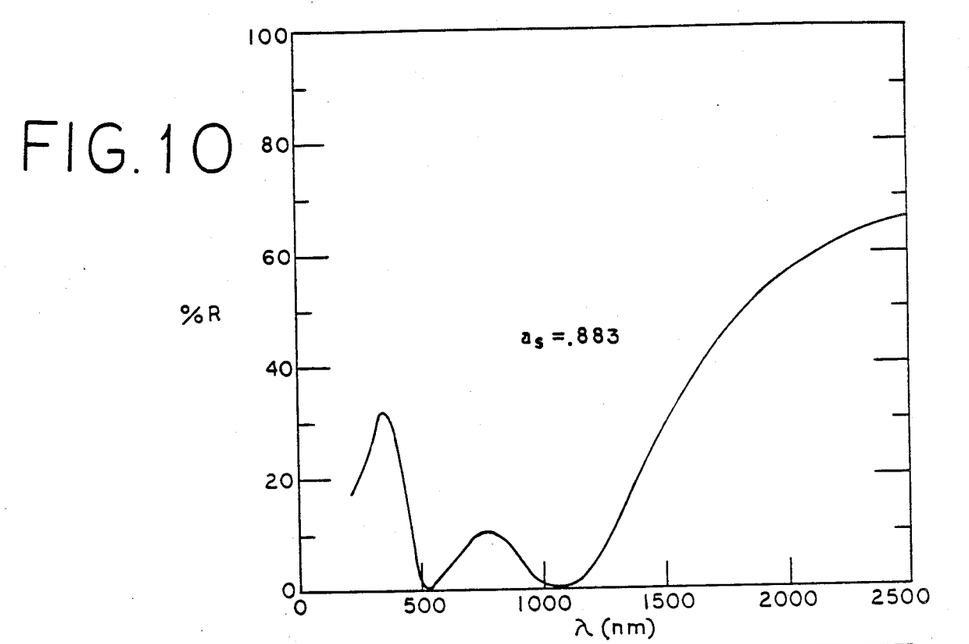
FIG. 10 is a graph of percent reflectance versus wavelength for a device having an antireflecting layer comprising an amorphous alloy of silicon and oxygen, a solar absorbing layer comprising an amorphous alloy of 50% germanium and 50% boron, and an infrared reflecting layer comprising stainless steel.

FIG. 10 shows these same parameters for a similar device but utilizing stainless steel as a TIR layer 14. Similar results were achieved but for a reflectance approaching 70% at 2500 nm. This is still a marked improvement over prior art devices.

Figure 11:
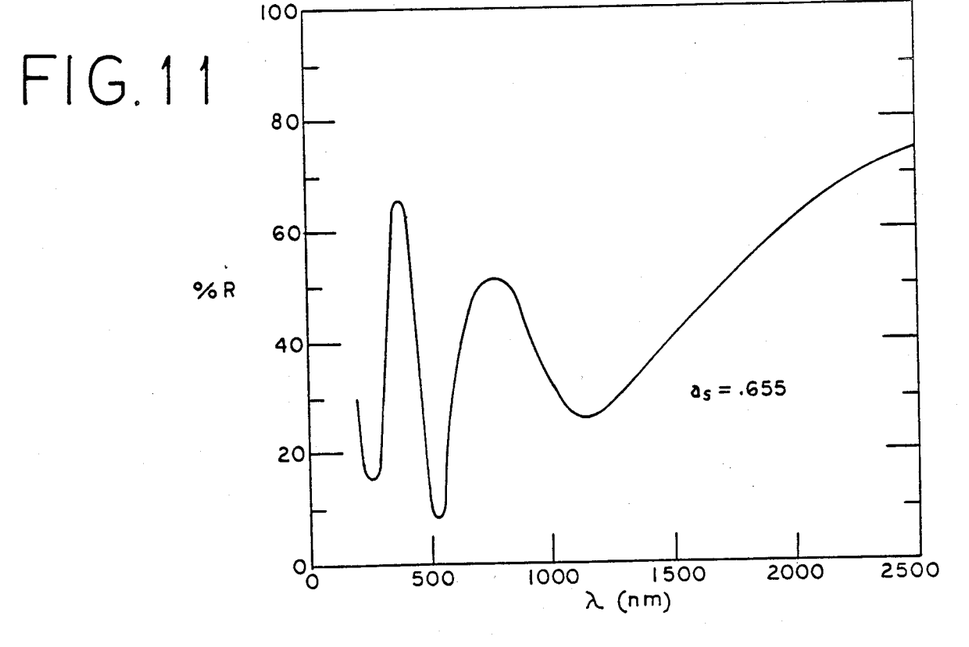
FIG. 11 is a graph of percent reflectance versus wavelength for a device having an antireflecting layer comprising an amorphous alloy of silicon and oxygen, a solar absorbing layer comprising an amorphous alloy of 88% boron and 12% silicon, and an infrared reflecting layer comprising stainless steel.

The empirical results for a device having stainless steel functioning as both the device substrate 12 and the TIR layer 14, a solar absorbing layer 16 comprising an amorphous alloy of 88% boron and 12% silicon and an antireflecting layer 18 comprising an amorphous alloy of silicon and oxygen are illustrated in FIG. 11. Here again, reflectance at about 2500 nm approaching 70% is documented with a similar absorption figure in the TSS.

Figure 12:
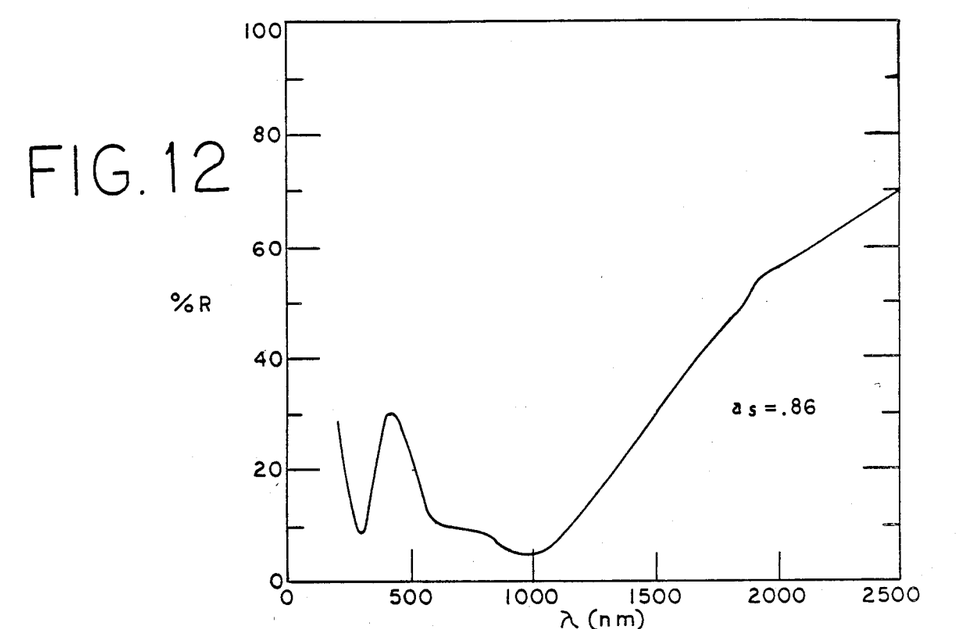
FIG. 12 is a graph of percent reflectance versus wavelength for a device having an antireflecting layer comprising an amorphous alloy of silicon and oxygen, a solar absorbing layer comprising an amorphous alloy of 30% boron and 70% germanium, and an infrared reflecting layer comprising nickel.

The device for which results are plotted in FIG. 12 utilizes a solar antireflecting layer of an amorphous alloy of silicon and oxygen and a solar absorbing layer comprising an amorphous alloy of approximately 30% boron and 70% germanium. The thermal infrared reflecting layer comprises nickel. This configuration exhibited absorption in the TSS of approximately 85% with reflectance at 2500 nm approaching 70%.

Figure 13:
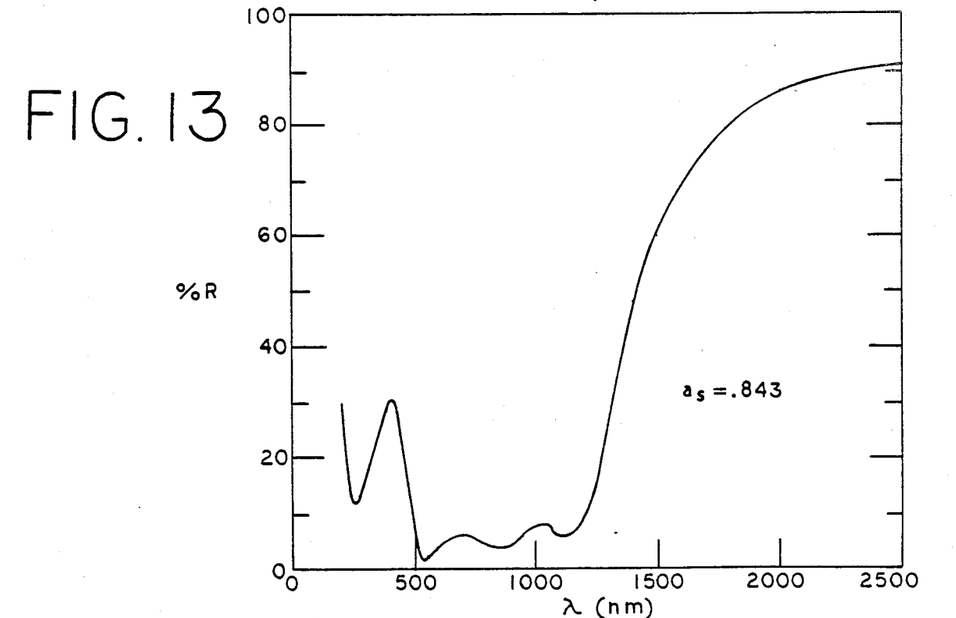
FIG. 13 is a graph of percent reflectance versus wavelength for a device having an antireflecting layer comprising an amorphous alloy of silicon and oxygen, a solar absorbing layer comprising an amorphous alloy of 70% germanium and 30% boron, and an infrared reflecting layer comprising zinc.

FIG. 13 plots the percent reflectance for a device similar to that employed with respect to FIG. 12 but having an infrared reflecting layer comprising zinc. The percent absorption in the TSS, 84.3%, is very similar to that obtained with the same device but having a nickel infrared reflecting layer. However, with the change to a zinc infrared reflecting layer we see an increase in the percent reflectance to approximately 85%.

Figure 14:
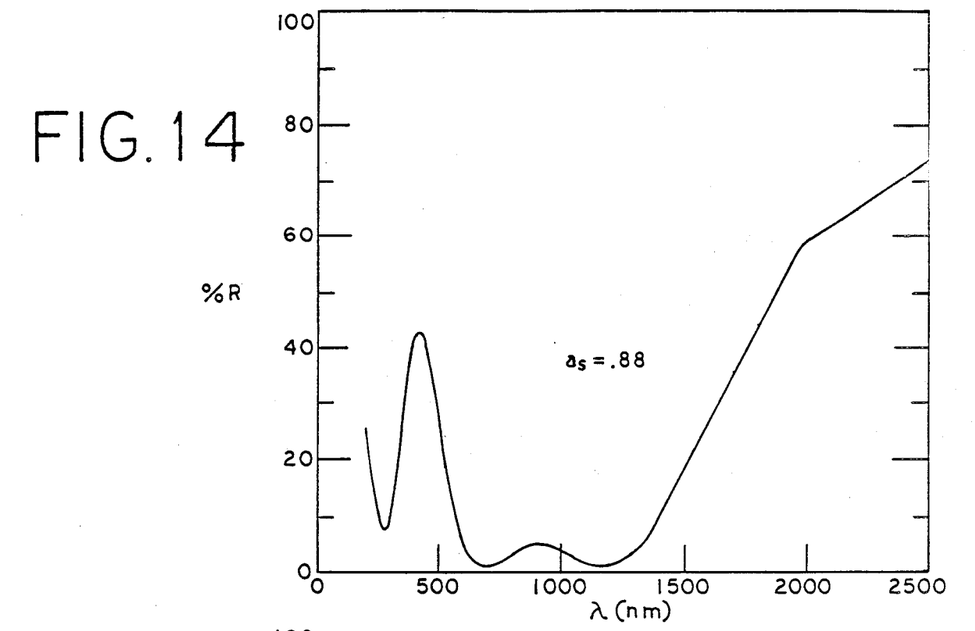
FIG. 14 is a graph of percent reflectance versus wavelength for a device having an antireflecting layer comprising an amorphous alloy of silicon and oxygen, a solar absorbing layer comprising an amorphous alloy of 30% boron and 70% germanium, and an infrared reflecting layer comprising molybdenum.

In FIG. 14, the results are plotted for a device similar to that tested for the data in FIG. 12 but having an infrared reflecting layer comprising molybdenum. The antireflecting layer and absorber layer comprise amorphous alloys of silicon-oxygen and boron-germanium respectively. As can be seen, the device exhibited 88% absorption in the TSS and reflectance at 2500 nm exceeding 70%.

Figure 15:
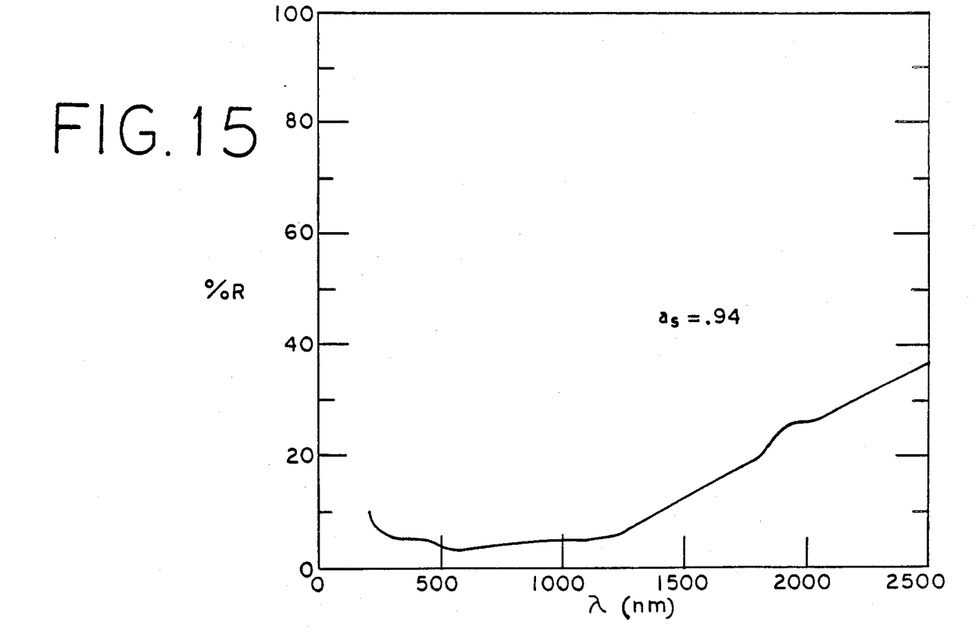
FIG. 15 is a graph of percent reflectance versus wavelength for a device having an antireflecting layer comprising an amorphous alloy of boron and nitrogen, a solar absorbing layer comprising an amorphous alloy of boron and silicon, and an infrared reflecting layer comprising aluminum.

FIG. 15 is a graph of the same parameters as FIGS. 9-14 but for a device having a TIR layer 14 comprising aluminum, a solar absorbing layer 16 comprising an amorphous alloy of boron and silicon, and an antireflecting layer 18 comprising 50% amorphous boron and 50% nitrogen. Here again the inventors have achieved absorption in the TSS of approximately 94% while maintaining a still very respectable reflectance figure at 2500 nm.

Figure 16:
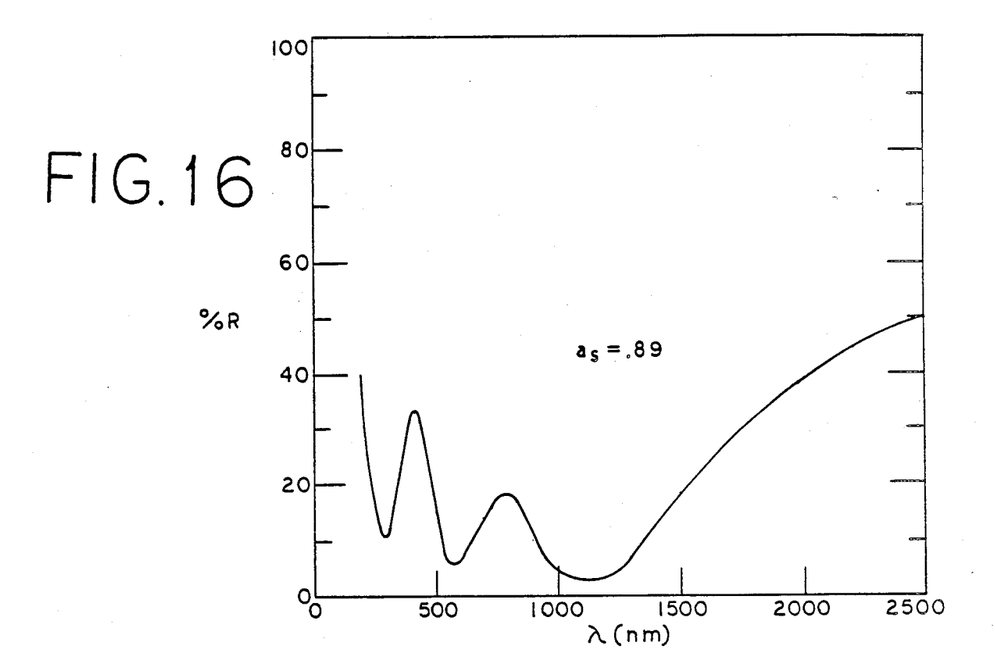
FIG. 16 is a graph of percent reflectance versus wavelength for a device having an antireflecting layer comprising an amorphous alloy of silicon and oxygen, a solar absorbing layer comprising an amorphous alloy of 65% boron and 35% silicon, and an infrared reflecting layer comprising tungsten.
Figure 17:
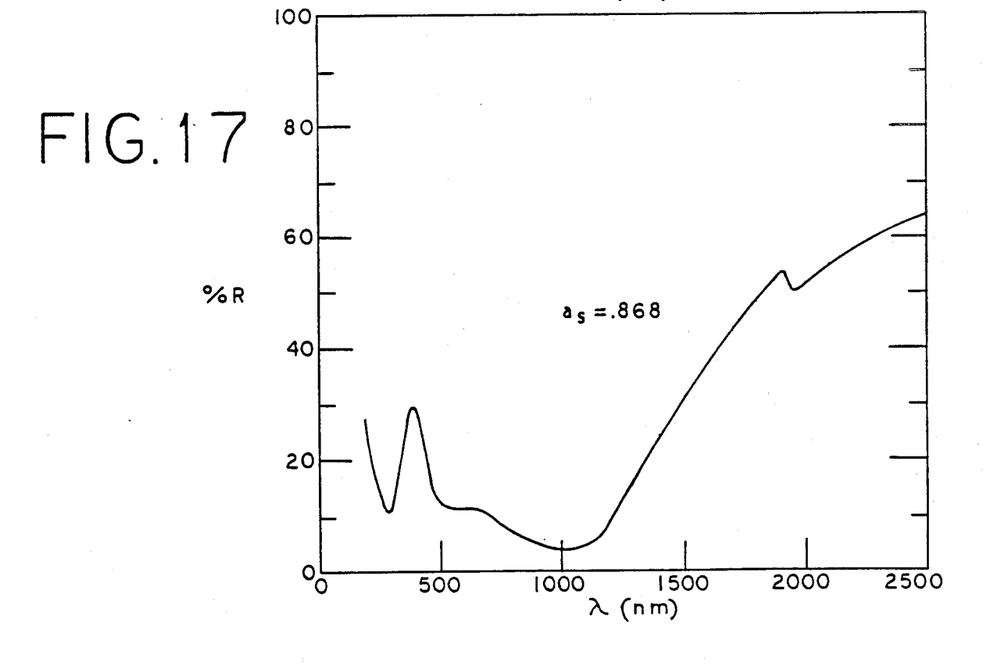
FIG. 17 is a graph of percent reflectance versus wavelength for a device having an antireflecting layer comprising an amorphous alloy of silicon and oxygen, a solar absorbing layer comprising an amorphous alloy of 65% boron and 35% silicon, and an infrared reflecting layer comprising molybdenum.

FIGS. 16 and 17 plot the results for two devices, each of which having antireflecting layers comprising amorphous silicon-oxygen alloys and absorber layers comprising amorphous boron-silicon alloys in proportion of 65% boron and 35% silicon.

The device of FIG. 16 has an infrared reflecting layer of tungsten. It absorbed 89% of the light in the TSS while reflecting 50% of the light at 2500 nm.

The device of FIG. 17 had an infrared reflecting layer comprising molybdenum. It absorbed 86.8% of the light in the TSS and the reflectance increased to better than 60%.

It should be noted that the percent reflectance discussed with relation to FIGS. 9-17 are weighted averages. The solar spectrum contains proportionately a much greater amount of light at wavelengths in the approximate range of 500 nm to 1700 nm. Therefore, despite the somewhat lower TIR reflectance graphically illustrated in, for example, FIG. 15, overall absorption in excess of 90% can be reasonably obtained.

Modifications and variations of the present invention are possible in light of the above teachings. It is therefore to be understood that within the scope of the appended claims, the invention may be practiced otherwise than as specifically described.

What is claimed and described to be secured by Letters Patent of the United States is:

1. A photothermal device for converting solar radiation to heat, said device comprising a layer of thermal infrared radiation reflecting material, a layer of solar radiation absorbing material overlying said layer of reflecting material, and a layer of solar radiation antireflecting material overlying said layer of absorbing material, said layer of solar radiation absorbing material consisting essentially of an alloy of amorphous boron and germanium, said alloy including between approximately thirty (30) and sixty (60) percent boron.

2. A device as defined in claim 1 wherein said radiation absorbing layer has a thickness, and wherein said thickness is between one-eighth and three-eighths of the wavelength of the maximum energy point of the radiation spectrum within said alloy forming said radiation absorbing layer.

3. A device as defined in claim 2 wherein said thickness is equal to one-fourth of the wavelength of the maximum energy point of the radiation spectrum within said alloy forming said radiation absorbing layer.

4. A device as defined in claim 1 wherein said radiation absorbing layer has thickness, and wherein said thickness is between one-eigth and three-eigths of the wavelength of the maximum energy point of the radiation spectrum within said alloy forming said radiation absorbing layer.

5. A device as defined in claim 4 wherein said thickness is equal to one-fourth of the wavelength of the maximum energy point of the radiation spectrum within said alloy forming said radiation absorbing layer.

6. A device as defined in claim 1 further comprising a substrate, said thermal infrared radiation reflecting material overlying said substrate.

7. A device as defined in claim 6 wherein said thermal infrared radiation reflecting material comprises one of the group consisting of tungsten or molybdenum and alloys thereof.

8. A device as defined in claim 6 wherein said reflecting material is formed from a compound chosen from the group consisting of the compounds of molybdenum and tungsten.

9. A device as defined in claim 8 wherein said compound is a compound of an element selected from the group consisting of molybdenum and tungsten and an element selected from the group consisting of boron, carbon, and nitrogen.

10. A device as defined in claim 9 wherein reflecting material comprises an alloy of said compounds.

11. A device as defined in claim 1 further comprising a substrate, said thermal infrared radiation reflecting material overlying said substrate.

12. A device as defined in claim 11 wherein said transition metal is one of the group consisting of tungsten and molybdenum, and alloys thereof.

13. A device as defined in claim 11 wherein said reflecting material is formed from a compound chosen from the group consisting of molybdenum and tungsten compounds.

14. A device as defined in claim 13 wherein said compound is a compound of an element selected from the group consisting of molybdenum and tungsten and an element selected from the group consisting of boron, carbon, and nitrogen.

15. A device as defined in claim 14 wherein said reflecting material comprises an alloy of said compounds.

16. A device as defined in claim 1 wherein said solar radiation antireflecting material comprises an amorphous alloy of silicon and nitrogen.

17. A device as defined in claim 16 wherein the index of refraction of said solar radiation antireflecting material is about 85 to 100 percent of the square root of the index of refraction of said absorbing material.

18. A device as defined in claim 1 wherein said solar radiation antireflecting material comprises an amorphous alloy of silicon and nitrogen.

19. A device as defined in claim 1 wherein said radiation absorbing layer has thickness, and wherein said thickness is at least approximately one micron.

* * * * *